United States Patent
Seo

(10) Patent No.: US 11,415,862 B2
(45) Date of Patent: Aug. 16, 2022

(54) ELECTRONIC APPARATUS

(71) Applicant: CANON KABUSHIKI KAISHA, Tokyo (JP)

(72) Inventor: Takazumi Seo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/180,132

(22) Filed: Feb. 19, 2021

(65) Prior Publication Data

US 2021/0271151 A1  Sep. 2, 2021

(30) Foreign Application Priority Data

Feb. 27, 2020  (JP) .............................. JP2020-032452

(51) Int. Cl.
  *G03B 7/095* (2021.01)
  *G03B 13/36* (2021.01)
  *G06F 3/01* (2006.01)
  *H04N 5/232* (2006.01)

(52) U.S. Cl.
  CPC ............. *G03B 7/095* (2013.01); *G03B 13/36* (2013.01); *G06F 3/016* (2013.01); *H04N 5/23212* (2013.01)

(58) Field of Classification Search
  CPC ........ G03B 7/095; G03B 17/02; G03B 13/36; H04N 5/23212; G06F 3/016
  See application file for complete search history.

(56) References Cited

U.S. PATENT DOCUMENTS

| | | | |
|---|---|---|---|
| 2020/0322517 A1* | 10/2020 | Tani | H04N 5/225 |
| 2021/0271325 A1* | 9/2021 | Seo | H04N 5/232935 |
| 2021/0357033 A1* | 11/2021 | Nakashima | G06F 3/016 |

FOREIGN PATENT DOCUMENTS

JP  2014164172 A  9/2014

* cited by examiner

*Primary Examiner* — Christopher E Mahoney
(74) *Attorney, Agent, or Firm* — Canon U.S.A., Inc. I.P. Division

(57) ABSTRACT

If vibration propagates to an operation button that is a moving member in a state where the operation button is not touched by a user, a noise is generated from near the operation button. Therefore, an electronic apparatus that reduces a noise generated from near an operation button is provided. In an electronic apparatus, a vibration device has a first vibration mode of vibrating an operation unit at a second position and a second vibration mode of vibrating an exterior member at a first position, and the operation unit is not in contact with a vibration propagation member at the first position, and the operation unit is in contact with the vibration propagation member at the second position or as the operation unit arrives at the second position.

8 Claims, 9 Drawing Sheets

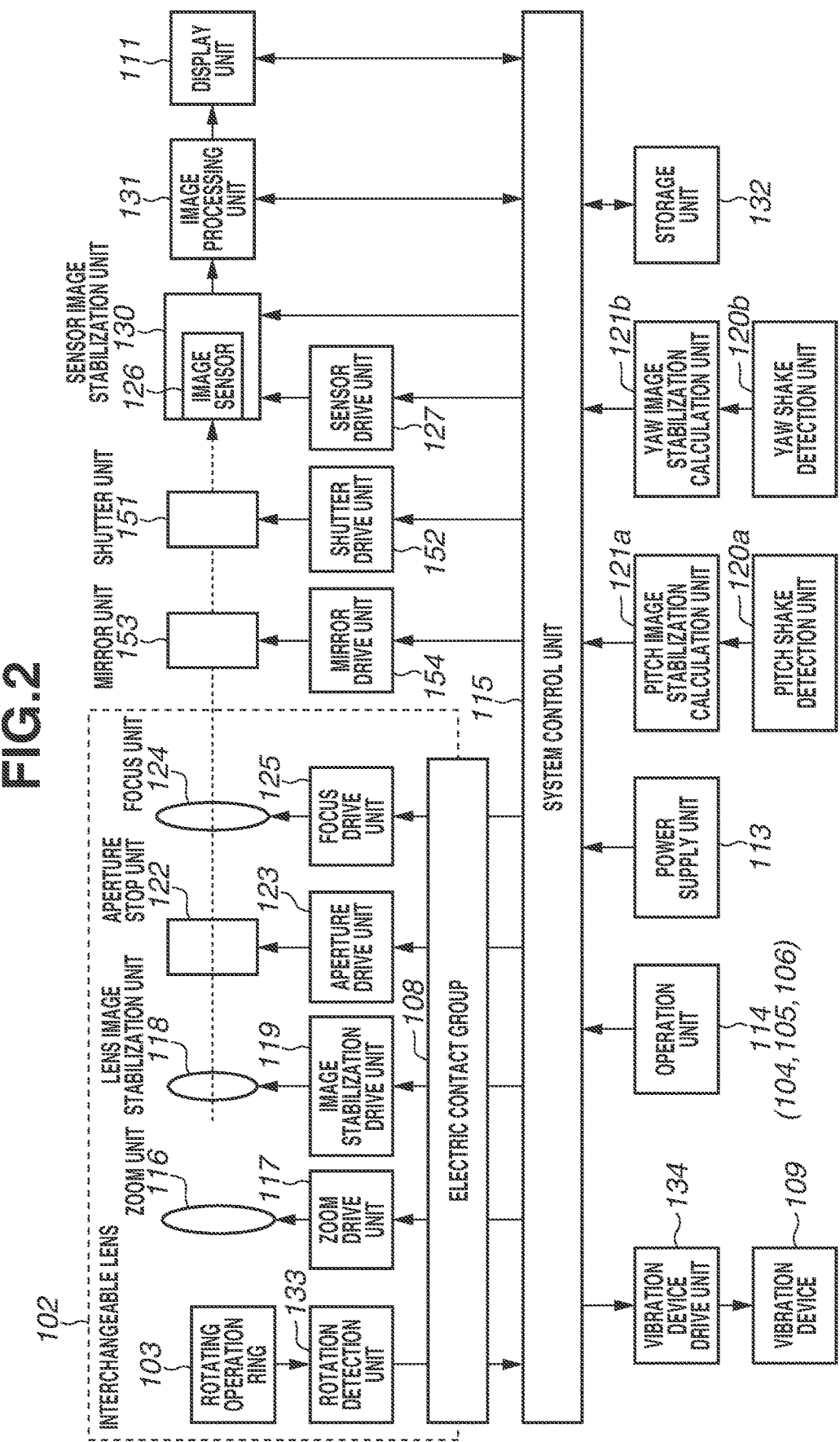

ELECTRONIC APPARATUS

BACKGROUND

Field of the Disclosure

The present disclosure relates to an electronic apparatus such as a digital camera including a vibration device.

Description of the Related Art

Operation members such as a rotating ring, a dial, and a button included in a conventional electronic apparatus each have a configuration that generates an operational feeling such as a click feeling in response to a user operation in many cases.

Japanese Patent Application Laid-Open No. 2014-164172 discusses a configuration in which a plurality of vibration devices is disposed on a surface of a release button, a grip portion, etc., and the vibration device vibrates in response to a user operation, so that a user is given an operational feeling.

The release button is held to be movable relative to an exterior cover, and thus an appropriate space is formed in a place where the release button slides relative to the exterior cover.

Therefore, if the vibration device vibrates in a state where the release button is not touched by the user, the release button rocks relative to the exterior cover by the above-described space, so that a noise is generated from near the release button.

Further, if a plurality of vibration devices is disposed at different points inside a camera as in Japanese Patent Application Laid-Open No. 2014-164172, it may be desirable to provide a large space for installation and electric wiring members, so that downsizing of an imaging apparatus is hindered.

SUMMARY

According to an aspect of the present disclosure, an electronic apparatus includes an operation unit, a vibration device configured to vibrate the electronic apparatus to transmit a sense of touch to a user corresponding to an operation of the operation unit by the user, an exterior member to which the vibration device is attached, a vibration propagation member in contact with the vibration device, and a detection unit configured to detect the operation unit being operated to shift from a first position to a second position, wherein the vibration device has a first vibration mode of vibrating the operation unit at the second position and a second vibration mode of vibrating the exterior member at the first position, and wherein the operation unit is not in contact with the vibration propagation member at the first position, and the operation unit is in contact with the vibration propagation member at the second position or as the operation unit arrives at the second position.

Further features of the present disclosure will become apparent from the following description of exemplary embodiments with reference to the attached drawings.

BRIEF DESCRIPTION OF THE DRAWINGS

FIG. 2 is a block diagram illustrating a configuration of the camera according to the exemplary embodiment of the present disclosure.

DESCRIPTION OF THE EMBODIMENTS

An example of an electronic apparatus according to each of exemplary embodiments of the present disclosure will be described below with reference to FIGS. 1A to 6B.

In a first exemplary embodiment, vibration of a vibration device 109 propagates to an external surface 106d of a release button 106 via a contact portion 106b of the release button 106.

(Perspective View of Main Body of Imaging Apparatus)

Figure 1A:
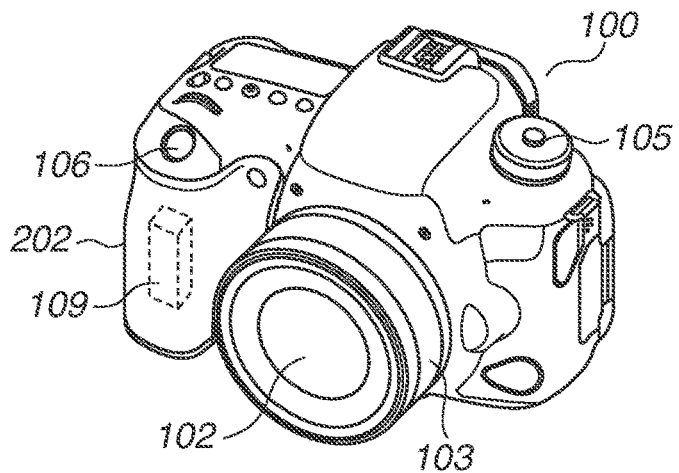
FIGS. 1A, 1B, 1C, and 1D are a front perspective view of a camera according to an exemplary embodiment of the present disclosure, a rear perspective view of the camera, an exploded perspective view of a camera body and an interchangeable lens attached thereto, and a diagram illustrating an internal structure of a vibration device, respectively.
Figure 1B:
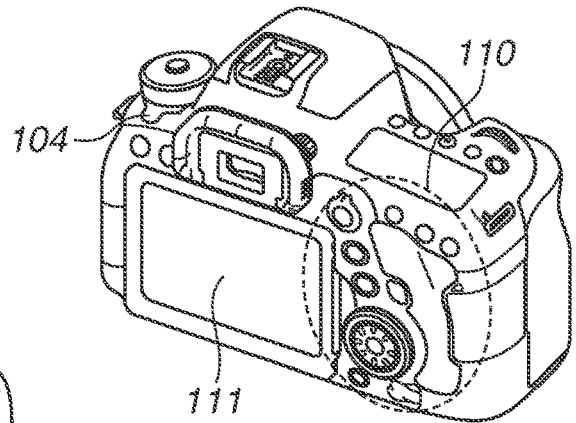
Figure 1C:
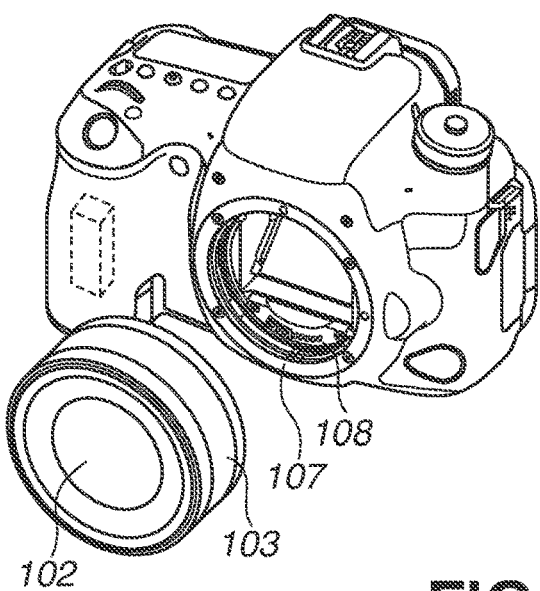

FIGS. 1A to 1C are perspective views of a main body of an interchangeable-lens digital camera (hereinafter referred to as "camera") serving as an imaging apparatus to which an interchangeable lens can be attached.

FIG. 1A is a front perspective view of a main body of a camera 100, and FIG. 1B is a rear perspective view of the main body of the camera 100.

Figure 1D:
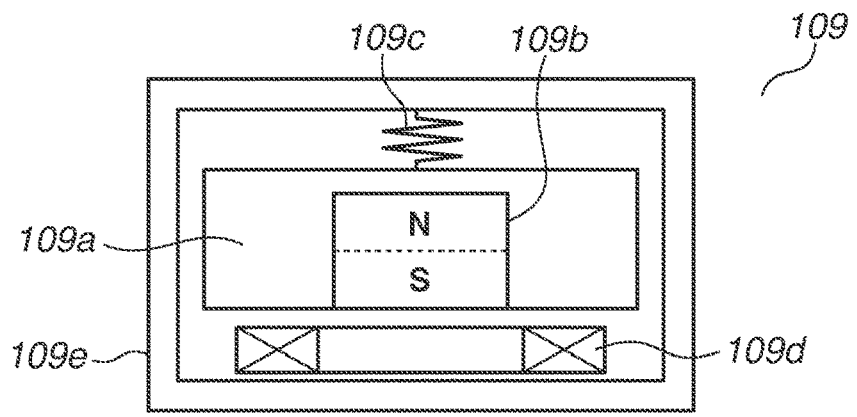

FIG. 1C illustrates a state before an interchangeable lens 102 is attached to the camera 100. FIG. 1D illustrates an internal structure of the vibration device 109.

A front grip 202 protruding toward the front of the camera 100 for a user to hold the camera 100 is on the front face of the camera 100.

A mount portion 107 that enables attachment and detachment of the interchangeable lens 102 is in a central part of the front face of the camera 100.

A rotating operation ring 103 is on the outer periphery of the interchangeable lens 102.

The rotating operation ring 103 can be operated by the user to rotate around the optical axis of the interchangeable lens 102, and the user can assign a function of changing imaging conditions such as a focus position and an exposure value to the rotating operation ring 103.

A power lever 104, a mode dial 105, and the release button 106 are on a top surface of the camera 100.

The power lever 104 is an operation member for powering on/off the camera 100 based on a lever operation by the user.

The mode dial 105 is an operation member for switching between various imaging modes based on a rotation operation by the user.

The various imaging modes include a manual still-image capturing mode for enabling the user to freely set imaging conditions such as a shutter speed and an aperture value, an automatic still-image capturing mode for automatically achieving an appropriate exposure amount, and a moving-image capturing mode for capturing a moving image.

The release button 106 is an operation member for starting imaging based on a pressing operation by the user. The vibration device 109 to be described below is attached to the inside of the front grip 202.

The vibration device 109 is, for example, a linear resonant actuator (LRA) type or piezoelectric element type vibration device, and vibration parameters such as an oscillation strength (amplitude) and an oscillation frequency can be variably set.

The vibration device 109 generates vibration in response to a user operation of the operation member such as the rotating operation ring 103, the mode dial 105, or the release button 106.

Further, vibration in various vibration patterns can be generated from the vibration device 109 by changing the vibration parameters.

A back operation unit 110 and a display unit 111 are on a back face of the camera 100.

In a state where the camera 100 is powered on, and the still-image or moving-image capturing mode is set, the display unit 111 displays an image signal (a live view) of an object image captured by an image sensor (not illustrated).

The display unit 111 also displays an imaging parameter indicating an imaging condition such as a shutter speed or an aperture value, so that the user can change a value set as the imaging parameter by operating the back operation unit 110 while viewing the display on the display unit 111.

The back operation unit 110 includes a playback button for providing an instruction for playback of a recorded captured image, and the user operates the playback button to play back a captured image so that the image is displayed on the display unit 111.

The mount portion 107 of the camera 100 includes an electric contact group 108. The camera 100 communicates with and supplies power to the interchangeable lens 102 attached to the mount portion 107, via the electric contact group 108.

FIG. 1D illustrates the internal structure of the vibration device 109 attached to the inside of the front grip 202.

The vibration device 109 of the LRA type includes a vibrator 109a, a magnet 109b, a spring 109c, a coil 109d, and a base 109e.

The vibrator 109a holds the magnet 109b and is movably coupled to the base 109e by the spring 109c.

The coil 109d is near the magnet 109b and electrically connected to a system control unit 115 (see FIG. 2).

The coil 109d generates an electromagnetic force by receiving an electric current from the system control unit 115, and the vibrator 109a reciprocates based on an attracting force or repulsive force between the electromagnetic force and the magnet 109b, so that vibration is generated in the vibration device 109.

(Block Diagram Illustrating Interchangeable Lens and Imaging Apparatus)

FIG. 2 illustrates an electrical and optical configuration of the camera 100.

The camera 100 includes a power supply unit 113 that supplies power to each unit to be described below, and an operation unit 114 including the power lever 104, the mode dial 105, the release button 106, and the back operation unit 110 described above.

The system control unit 115 controls the entire camera system including the camera 100 and the interchangeable lens 102.

During the control, the interchangeable lens 102 communicates with the system control unit 115 via the electric contact group 108 described above. The system control unit 115 controls the entire camera system by reading out a control program stored in a memory (not illustrated) and executing the read-out control program.

The interchangeable lens 102 includes a zoom unit 116 including a zoom lens that moves in an optical axis direction to perform magnification, and a lens image stabilization unit 118 including a shift lens that moves (shifts) in an X/Y axis direction orthogonal to the optical axis to recue (correct) an image blur.

The interchangeable lens 102 further includes an aperture stop unit 122 having a light amount adjustment function, and a focus unit 124 including a focus lens that moves in the optical axis direction to adjust the focus.

The interchangeable lens 102 further includes a rotation detection unit 133 that detects rotation of the rotating operation ring 103.

When an instruction for magnification is input via the rotation detection unit 133 based on an operation of the rotating operation ring 103, the system control unit 115 controls driving of the zoom unit 116 via a zoom drive unit 117 in the interchangeable lens 102 to perform magnification.

The system control unit 115 also controls driving of the aperture stop unit 122 via an aperture drive unit 123 in the interchangeable lens 102, based on a value set as an aperture value received from the operation unit 114 or a luminance signal acquired from an image processing unit 131.

The system control unit 115 also controls driving of the focus unit 124 via a focus drive unit 125 in the interchangeable lens 102 based on a focus signal obtained from the image processing unit 131 to perform autofocus.

The camera 100 is provided with a pitch image stabilization calculation unit 121a and a yaw image stabilization calculation unit 121b.

The pitch image stabilization calculation unit 121a calculates a shift position of each of the lens image stabilization unit 118 (the shift lens) and a sensor image stabilization unit 130 (an image sensor 126) in the Y-axis direction, using a shake signal from a pitch shake detection unit 120a.

The yaw image stabilization calculation unit 121b calculates a shift position of each of the lens image stabilization unit 118 and the sensor image stabilization unit 130 in the X-axis direction, using a shake signal from a yaw shake detection unit 120b.

The camera 100 is provided with a sensor drive unit 127 that drives the sensor image stabilization unit 130. The interchangeable lens 102 is provided with an image stabilization drive unit 119 that drives the lens image stabilization unit 118.

The system control unit 115 controls the shift position of each of the lens image stabilization unit 118 and the sensor image stabilization unit 130 via the image stabilization drive unit 119 and the sensor drive unit 127, based on the shift position in the pitch direction and the shift position in the yaw direction calculated by the pitch image stabilization calculation unit 121a and the yaw image stabilization calculation unit 121b.

Image stabilization operation for correcting an image blur is thus performed.

The camera 100 includes a mirror unit 153 including a main mirror and a sub mirror (not illustrated), and a mirror drive unit 154 that drives the mirror unit 153.

The camera 100 includes a shutter unit 151 including a mechanical focal plane shutter (not illustrated), and a shutter drive unit 152 that drives the shutter unit 151.

The system control unit 115 also controls driving of the shutter unit 151 and the mirror unit 153 via the mirror drive unit 154 and the shutter drive unit 152, in response to an imaging instruction provided by operating the release button 106.

An optical image formed by the interchangeable lens 102 is exposed on the image sensor 126, and photoelectrically converted by the image sensor 126 to be output as an image pickup signal.

The image processing unit 131 performs various types of image processing on the image pickup signal to generate an image signal and the generated image signal is stored into a storage unit 132 such as a secure digital (SD) card.

The display unit 111 displays the image signal (a live view) output from the image processing unit 131, or displays a captured image recorded in the storage unit 132 and played back.

When detecting the rotating operation ring 103 or the operation unit 114 being operated, the system control unit 115 causes a vibration device drive unit 134 to output a driving signal to the vibration device 109, so that the vibration device 109 generates vibration.

In this way, the vibration device 109 applies vibration to the front grip 202 illustrated in FIG. 1A.

Therefore, the user holding the front grip 202 can be given a click feeling when rotating the rotating operation ring 103 and an operational feeling when operating the operation unit 114.

(Developed Perspective View of Each Unit of Camera 100)

Figure 3:
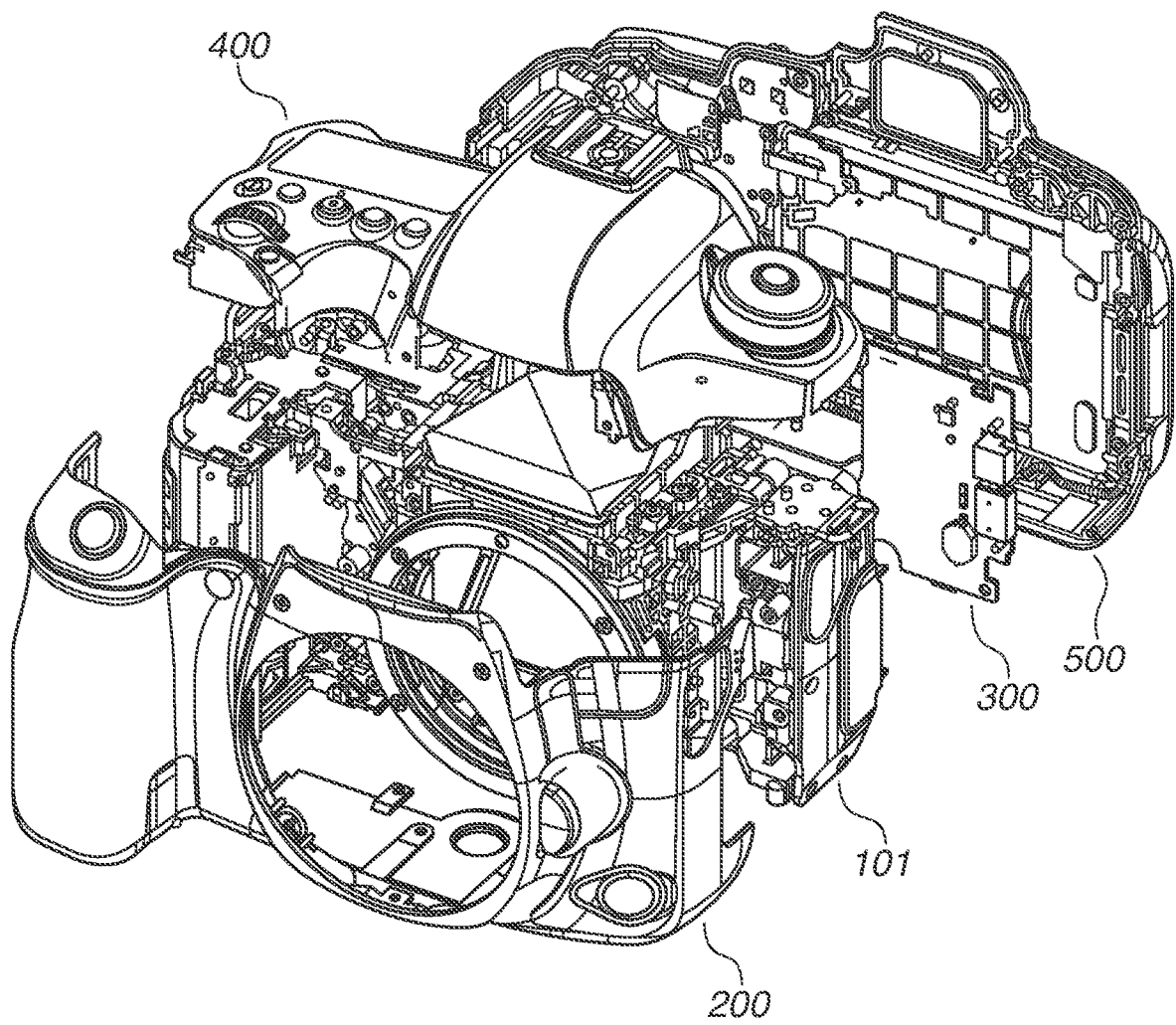
FIG. 3 is an exploded perspective view of the camera according to the exemplary embodiment of the present disclosure.

FIG. 3 is a developed perspective view of each unit of the camera 100. The camera 100 includes an internal structure 101, a front cover unit 200, and a top cover unit 400, and a rear cover unit 500. The system control unit 115 is screw-fastened to the internal structure 101.

(Front Perspective View of Front Cover Unit 200)

Figure 4A:
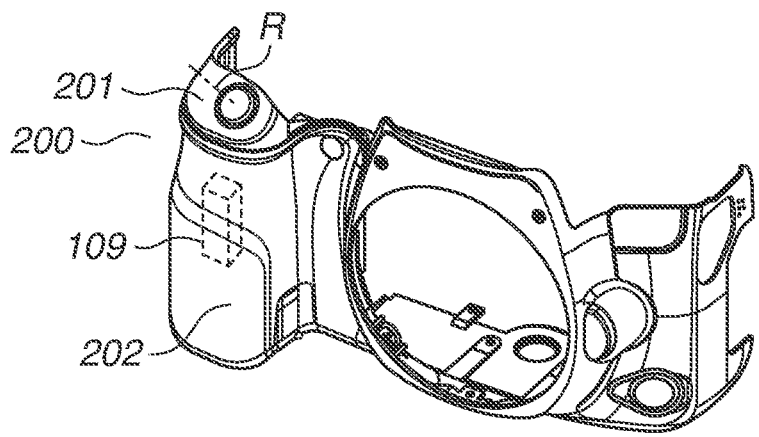
FIGS. 4A and 4B illustrate a front perspective view and an exploded perspective view, respectively, of a front cover unit in a camera according to a first exemplary embodiment.
Figure 4B:
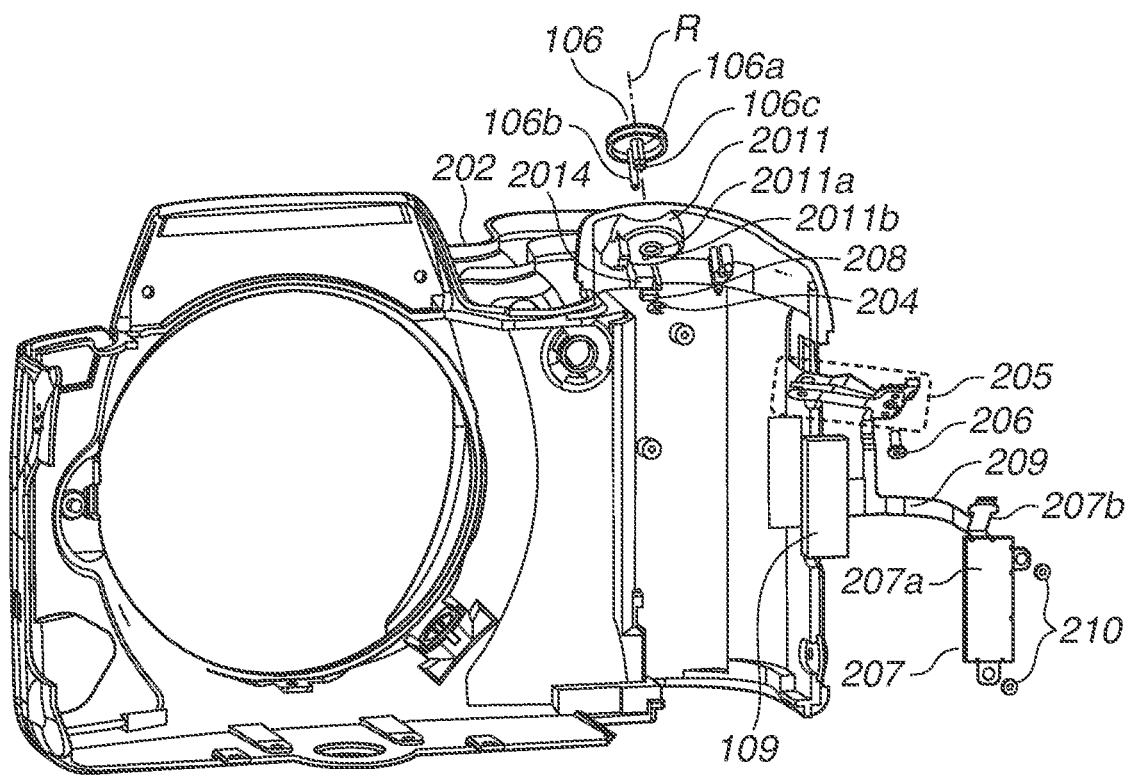

FIG. 4A is a front perspective view of the front cover unit 200, and FIG. 4B is a rear exploded perspective view of the front cover unit 200.

The front cover unit 200 includes a front cover 201 made of resin and serving as an exterior cover, and the front grip 202 having an elastic outer layer and to be held by the user.

The front grip 202 is attached from the outside of the front cover 201, and fixed with a double-sided tape (not illustrated).

The release button 106 includes a pusher 106a and the contact portion 106b disposed on a rear surface thereof and extending in a direction of pressing the release button 106 (hereinafter referred to as "R-axis direction").

The pusher 106a of the release button 106 includes a groove portion 106c to which an E-ring 204 is to be attached.

The front cover 201 includes a storage portion 2011 for storing the release button 106, and the storage portion 2011 has through holes 2011a and 2011b which the pusher 106a and the contact portion 106b of the release button 106 pass through, respectively.

The release button 106 is fit into the storage portion 2011 from the outside of the front cover 201, and the E-ring 204 is fit in the groove portion 106c of the pusher 106a passing through the front cover 201 up to the inside thereof.

The E-ring 204 prevents the release button 106 from being removed from the front cover 201.

A vibration damping member 208 is a rectangular component, and made of a material to be significantly deformed by a small force and having a large elastic deformation area, such as rubber or elastomer.

The vibration damping member 208 is fixed to a base 2014 in the inside of the front cover 201, by a double-sided tape (not illustrated).

A switch unit 205 detects the release button 106 being pressed in two stages. The switch unit 205 includes three contact pieces, i.e., a first contact piece 2051, a second contact piece 2052, and a third contact piece 2053 to be described below that are configured to sequentially turn on a first switch SW1 and a second switch SW2 based on a press amount.

The switch unit 205 includes a flexible board 209 on which a plurality of circuits is wired, and the three contact pieces 2051, 2052, and 2053 are in contact with and electrically connected to the respective circuits of the flexible board 209.

Further, circuits for driving the vibration device 109 are also wired on the flexible board 209, and the circuits of the vibration device 109 and the circuits of the flexible board 209 are electrically connected.

The flexible board 209 is connected to the system control unit 115 (see FIG. 2). The switch unit 205 is fixed to the inside of the front cover 201 with a screw 206.

A holding component 207 includes a base surface 207a for fixing the vibration device 109, and a vibration propagation portion 207b extending from the base surface 207a and elastically deformable in the R-axis direction.

The vibration device 109 is fixed to the base surface 207a of the holding component 207 by a double-sided tape (not illustrated). The holding component 207 to which the vibration device 109 is fixed is fixed to the inside of the front cover 201 with screws 210.

The vibration propagation portion 207b abuts the vibration damping member 208, in a state where the release button 106 is not operated (hereinafter referred to as "normal state").

As described above, the release button 106, the switch unit 205, the holding component 207 for fixing the vibration device 109, and the vibration damping member 208 are fixed to the same front cover 201.

The components are thus attached to the front cover 201, so that the assembly tolerance can be made small, making it easy to adjust the positional relationship between the related components.

(Front Cover Unit 200)

Figure 5A:
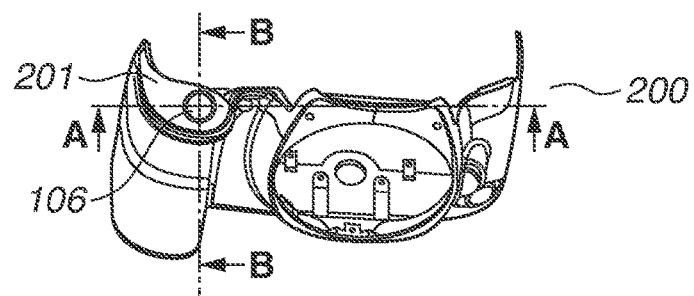
FIG. 5A is a diagram illustrating the front cover unit as viewed from above.
Figure 5B:
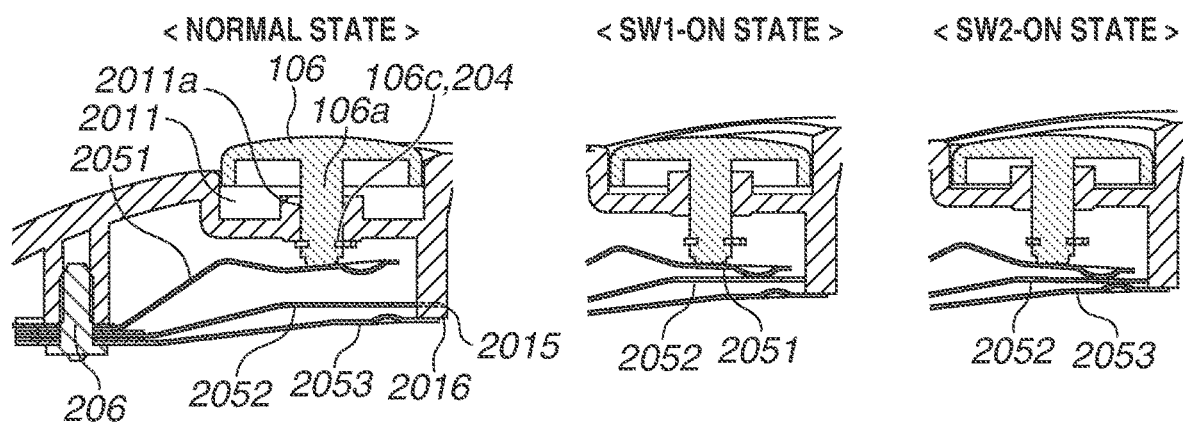
FIGS. 5B to 5D are cross-sectional diagrams illustrating the front cover unit, in the camera according to the first exemplary embodiment.
Figure 5C:
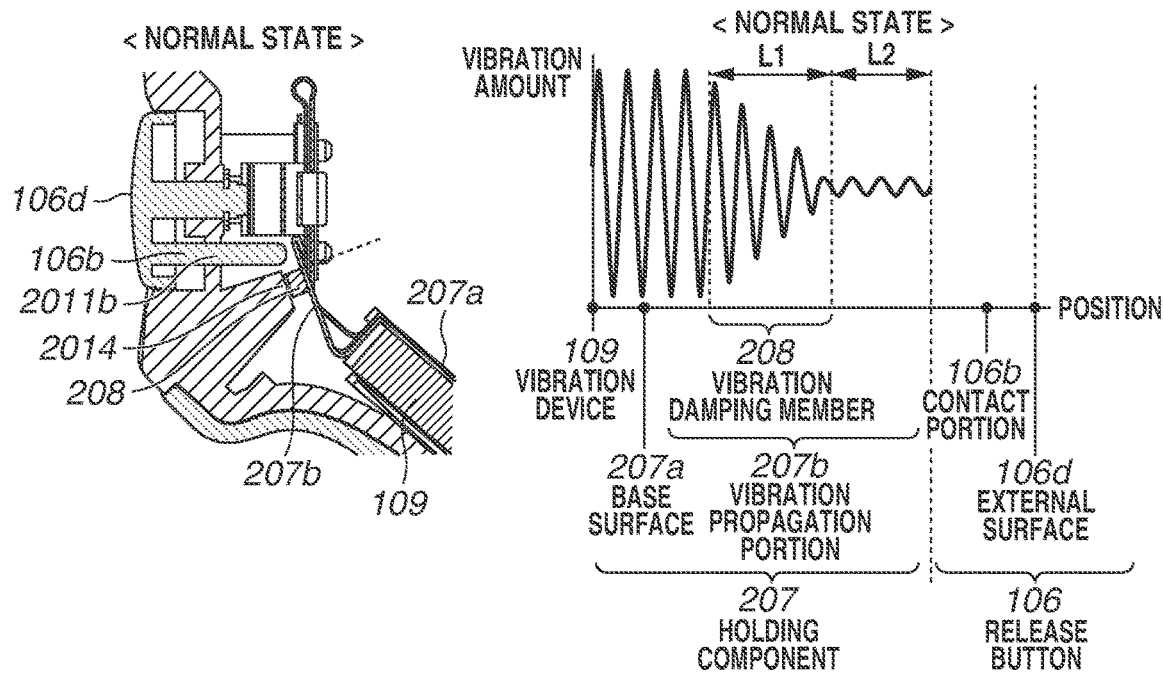
Figure 5D:
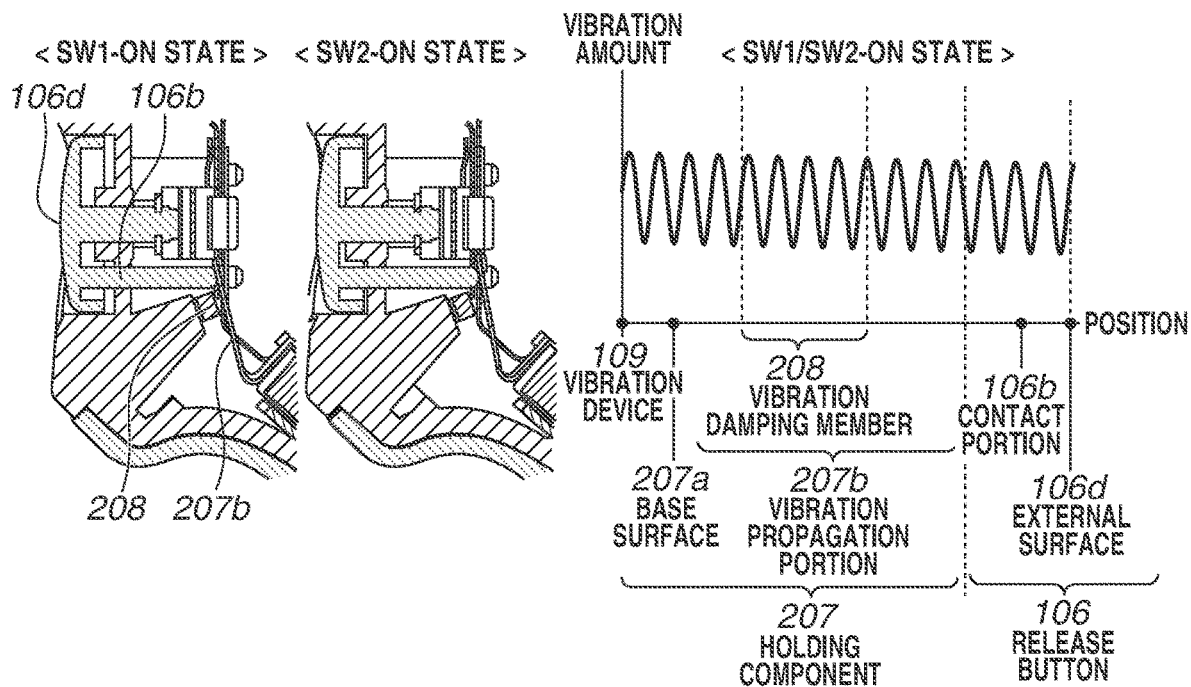

FIG. 5A illustrates the front cover unit 200 as viewed from immediately above the release button 106, and FIGS. 5B, 5C, and 5D each illustrate an enlarged cross-section taken along a line A-A or a line B-B in FIG. 5A.

The line A-A and the line B-B each pass through the central axis of the pusher 106a of the release button 106.

The switch unit 205 is fixed to the inside of the front cover 201 with the screw 206.

The switch unit 205 includes, in order from the release button 106 side, the first contact piece 2051, the second contact piece 2052, and the third contact piece 2053 insulated from each other.

A free end of the first contact piece 2051 is in pressure contact with the tip of the pusher 106a of the release button 106 to push the release button 106 upward.

The E-ring 204 fit in the groove portion 106c of the pusher 106a abuts a lower end of the storage portion 2011 of the front cover 201, so that an upper position of the release button 106 in the R-axis direction is regulated.

Free ends of the second contact piece 2052 and the third contact piece 2053 abut position regulating portions 2015 and 2016 of the front cover 201, so that the position of the free end of each of the second contact piece 2052 and the third contact piece 2053 in the R-axis direction is regulated.

When the release button 106 is pressed against an elastic force of the first contact piece 2051 from the normal state in FIG. 5B, the first contact piece 2051 elastically transforms to be in contact with the second contact piece 2052 as in a SW1-ON state illustrated in FIG. 5B, so that the first switch SW1 is turned on.

When the first switch SW1 is turned on, the focus drive unit 125 drives the focus unit 124 to adjust the focus.

Further, the aperture drive unit 123 drives the aperture stop unit 122 to perform automatic exposure (AE) processing, and the system control unit 115 makes preparations for image capturing such as automatic white balance (AWB) processing and electronic flash (EF) (i.e., preliminary flash emission) processing.

Subsequently, when the release button 106 is further pressed, the second contact piece 2052 comes into contact with the third contact piece 2053 as in an SW2-ON state illustrated in FIG. 5B, so that the second switch S2 is turned on.

When the second switch SW2 is turned on, the shutter drive unit 152 drives the shutter unit 151, and an optical image formed by the interchangeable lens 102 is exposed on the image sensor 126.

FIG. 5C illustrates a positional relationship between the contact portion 106b and the vibration propagation portion 207b as well as the vibration damping member 208 in the normal state of the release button 106, and illustrates how the vibration generated from the vibration device 109 propagates.

In the normal state illustrated in FIG. 5C, the vibration damping member 208 is pressed by the vibration propagation portion 207b to be in pressure-contact therewith. The vibration of the vibration device 109 propagates to the vibration propagation portion 207b via the base surface 207a of the holding component 207.

The amount of the vibration propagating to the vibration propagation portion 207b damps in a section L1 in which the vibration propagation portion 207b abuts the vibration damping member 208.

Therefore, the amount of the vibration propagating to a section L2 on the free end side of the vibration propagation portion 207b is smaller than the amount of the vibration generated in the vibration device 109.

Further, in the normal state, the vibration propagation portion 207b is away from the release button 106, so that the vibration is not directly transmitted from the vibration propagation portion 207b to the release button 106.

In other words, even if the vibration device 109 is driven in the normal state, a noise generated by the vibration of the release button 106 that is a movable portion or the vibration propagation portion 207b that is elastically deformable can be minimized.

FIG. 5D illustrates a positional relationship between the contact portion 106b and the vibration propagation portion 207b as well as the vibration damping member 208 in a SW1/SW2-ON state, and illustrates how the vibration generated from the vibration device 109 propagates.

Immediately before the SW1-ON state in FIG. 5D, the contact portion 106b of the release button 106 starts abutting the vibration propagation portion 207b, and the vibration propagation portion 207b starts being pressed downward.

In other words, when the user presses the release button 106, the amount of the pressure-contact between the vibration propagation portion 207b and the vibration damping member 208 decreases.

In the SW1/SW2-ON state illustrated in FIG. 5D, the vibration propagation portion 207b moves downward to a position at which the vibration propagation portion 207b is not in contact with the vibration damping member 208.

In this way, at the position in the SW1/SW2-ON state after the release button 106 is operated by the user, the vibration propagation portion 207b has such a positional relationship that the vibration propagation portion 207b is in contact with the contact portion 106b of the release button 106 and away from the vibration damping member 208.

The vibration of the vibration device 109 propagates to the vibration propagation portion 207b via the base surface 207a of the holding component 207, and propagates to the external surface 106d of the release button 106 via the contact portion 106b of the release button 106 without damping to keep the amount of the vibration large.

It is possible to give an operational feeling based on the vibration to a finger operating the release button 106, without causing a large damping of the vibration, even if the amount of the vibration of the vibration device 109 is reduced in the SW1/SW2-ON state.

In other words, the noise generated by the vibration of the vibration device 109 when the release button 106 is operated can be minimized.

(Enlarged View of Front Cover 201 as Viewed from Immediately Below Release Button)

Figure 6A:
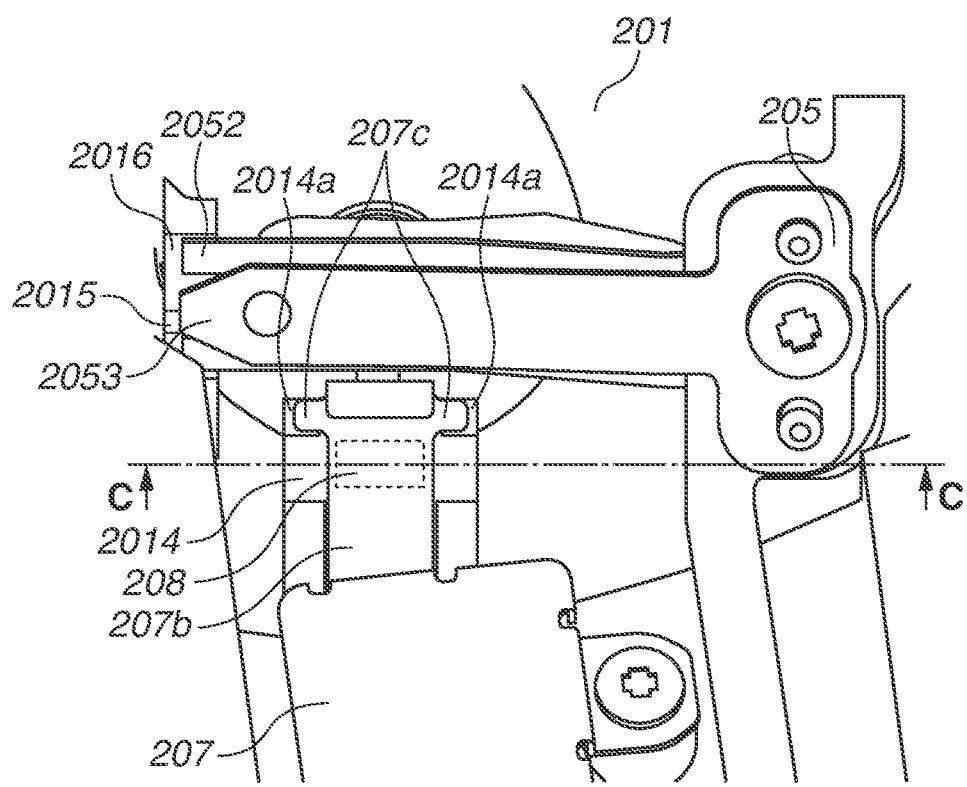
FIGS. 6A and 6B are an enlarged view of the front cover unit as viewed from below and a cross-sectional diagram illustrating the front cover unit, respectively, in the camera according to the first exemplary embodiment.
Figure 6B:
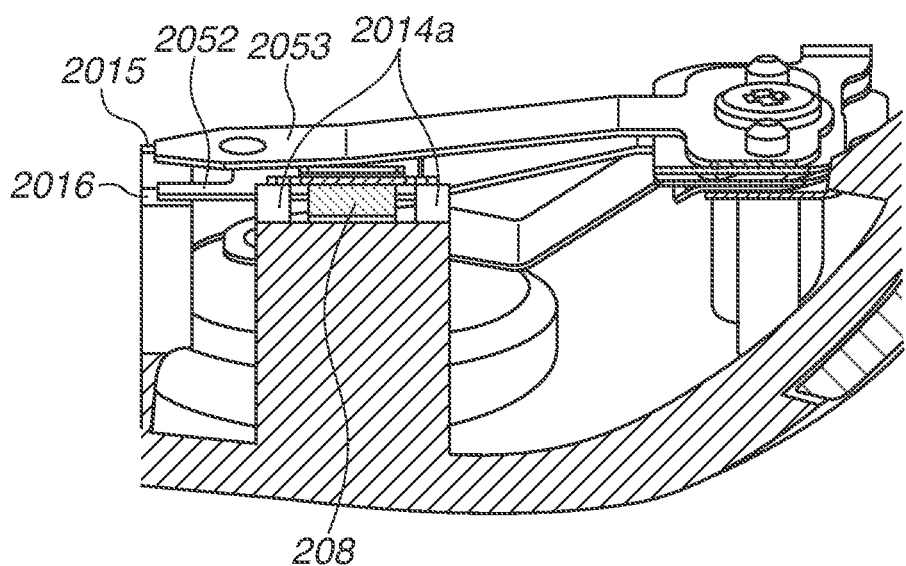

FIG. 6A is an enlarged view of the front cover 201 as viewed from immediately below the release button 106, and FIG. 6B is an enlarged view of a cross-section taken along a line C-C in FIG. 6A.

As described above, the release button 106, the switch unit 205, the holding component 207 to which the vibration device 109 is fixed, and the vibration damping member 208 are each fixed to the front cover 201.

The free ends of the second contact piece 2052 and the third contact piece 2053 that are components of the switch unit 205 abut the position regulating portions 2015 and 2016 of the front cover 201, so that the positions in the direction of pressing the release button 106 are regulated.

The free end of the vibration propagation portion 207b includes a brim portion 207c. The brim portion 207c abuts a position regulating member 2014a of the base 2014 of the front cover 201, so that the position of the free end of the vibration propagation portion 207b in the R-axis direction is regulated.

The vibration damping member 208 is between the brim portion 207c of the vibration propagation portion 207b and the vibration device 109.

The vibration damping member 208 is thus disposed, so that the vibration of the vibration propagation portion 207b first damps at a position where the vibration propagation portion 207b abuts the vibration damping member 208, and further damps at the brim portion 207c closer to the free end than the vibration damping member 208.

In other words, in the vibration propagation portion 207b, the brim portion 207c abuts the position regulating member 2014a of the front cover 201, but the vibration propagating to the abutment point is damped by the vibration damping member 208, so that the noise generated by the vibration can be minimized.

(Timing Chart of System Control Unit 115 During Imaging)

Figure 7:
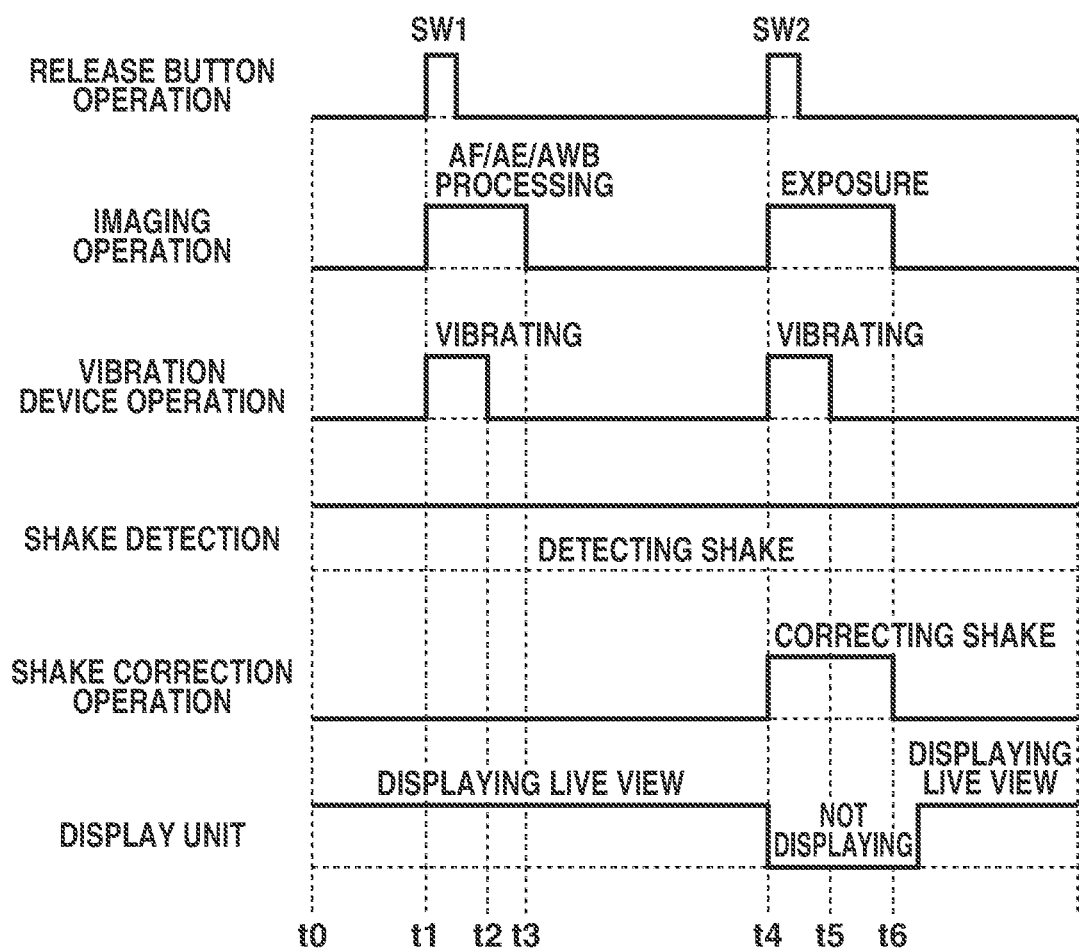
FIG. 7 is a timing chart of a system control unit in imaging in the camera according to the first exemplary embodiment.

FIG. 7 is a timing chart illustrating the progress of processing by the system control unit 115 during imaging by the camera 100 illustrated in FIG. 2.

In FIG. 7, a live view is displayed on the display unit 111 from a time t0 to a time t4. The pitch shake detection unit 120a and the yaw shake detection unit 120b constantly detect shakes of the camera 100.

Next, at a time t1, the system control unit 115 starts vibration device operation processing in response to detection of a half-press operation (the switch SW1) of the release button 106 by the user, and transmits a driving signal to the vibration device 109.

In response to this driving signal, the vibration device 109 vibrates in a period from the time t1 to a time t2, thereby feeding back an operational feeling of the half press to the user.

In a period from the time t1 immediately after the driving signal is transmitted to the vibration device 109 to a time t3, the system control unit 115 executes the AF, AE, and AWB processing.

Next, when a full-press operation (the switch SW2) of the release button 106 by the user is detected at the time t2, the system control unit 115 starts the vibration device operation processing, and transmits a driving signal to the vibration device 109.

In response to this driving signal, the vibration device 109 vibrates in a period from the time t4 to a time t5, thereby feeding back an operational feeling of the full press to the user.

Processing in a period from the time t4 immediately after the driving signal is transmitted to the vibration device 109 to a time t6 will be described below.

The system control unit 115 corrects a camera shake by driving the lens image stabilization unit 118 (hereinafter referred to as "lens shift unit 118") and the sensor image stabilization unit 130 (hereinafter referred to as "sensor unit 130") based on a shake signal detected by each of the pitch shake detection unit 120a and the yaw shake detection unit 120b, and causes the image sensor 126 to perform exposure processing.

In the timing chart in FIG. 7, the vibration generation period (from the time t4 to the time t5) in which the vibration device 109 vibrates in response to the detection of the switch SW2 overlaps the shake signal detection period in which the camera shake is corrected and the period in which the exposure is performed while the camera shake is corrected (from the time t4 to the time t6).

In other words, if the pitch shake detection unit 120a, the yaw shake detection unit 120b, the lens shift unit 118, and the sensor unit 130 are affected when the vibration is generated by driving the vibration device 109, the result of the camera-shake correction can be affected.

For this reason, when the release button 106 is operated, it may be desirable to minimize the influence on the pitch shake detection unit 120a, the yaw shake detection unit 120b, the lens shift unit 118, and the sensor unit 130 by reducing the vibration of the vibration device 109, unlike the time when other operation members are operated.

As described with reference to FIGS. 5A to 5D, when the release button 106 is operated, the vibration propagation portion 207b is in contact with the contact portion 106b of the release button 106.

Therefore, an operational feeling based on the vibration can be given to a finger operating the release button 106, even if the vibration of the vibration device 109 is reduced.

In other words, it is possible to give the user an operational feeling of image capturing when the release button 106 is operated by the user, while minimizing the noise generated by the vibration of the vibration device 109.

The electronic apparatus according to the present exemplary embodiment includes an operation unit (the release button 106), a vibration device (the vibration device 109) that vibrates the electronic apparatus to transmit a sense of touch corresponding to an operation of the operation unit by the user to the user, and an exterior member (the front cover 201) to which the vibration device is attached.

The electronic apparatus according to the present exemplary embodiment further includes a vibration propagation member (the holding component 207) in contact with the vibration device, and a detection unit (the switch unit 205) that detects the operation unit being operated to shift from a first position to a second position.

The vibration device 109 has a first vibration mode of vibrating the operation unit (the release button 106) at the second position and a second vibration mode of vibrating the exterior member (the front cover 201) at the first position.

The operation unit is not in contact with the vibration propagation member (the holding component 207) at the first position, and the operation unit is in contact with the vibration propagation member at the second position or before the operation unit arrives at the second position.

The operation unit includes a contact portion (the contact portion 106b) extending in a moving direction of the operation unit, and the vibration propagation member includes a base surface (the base surface 207a) on which the vibration device is mounted, and an extension portion (the vibration propagation portion 207b) extending toward the contact portion and elastically deformable.

The contact portion abuts the extension portion at the second position.

A vibration damping member (the vibration damping member 208) is attached to the inside of the exterior member, and the vibration damping member 208 is pressed by the extension portion (the vibration propagation portion 207b) to be in pressure-contact therewith at the first position.

As the operation unit nears the second position, the amount of the pressure-contact between the vibration damping member 208 and the extension portion (the vibration propagation portion 207b) decreases.

A position at which the vibration damping member 208 is in pressure-contact with the extension portion (the vibration propagation portion 207b) is between a part where the contact portion 106b and the extension portion (the vibration propagation portion 207b) abut each other at the second position and the base surface 207a.

The operation unit and the vibration propagation member are held by the exterior member.

Because the release button 106 and the vibration propagation portion 207b that transmits the vibration of the vibration device 109 are configured in the manner described above, the vibration can be propagated to the release button 106 using the vibration device 109 in the camera 100, only when the user operates the release button 106.

In addition, the noise generated by the vibration of the vibration device 109 can be minimized when an operation member other than the release button 106 is operated by the user.

The above-described exemplary embodiment is only a representative example, and can be variously altered and modified in implementing the present disclosure.

A second exemplary embodiment of the present disclosure will be described with reference to FIGS. 8A and 8B.

In the present exemplary embodiment, the vibration of the vibration device 109 propagates to the external surface 106d of the release button 106 via a contact portion 12051a of a first contact piece 12051 of a detection unit (the switch unit 205), unlike the first exemplary embodiment.

(Front Cover Unit 200 as Viewed from Immediately Above Release Button)

Figure 8A:
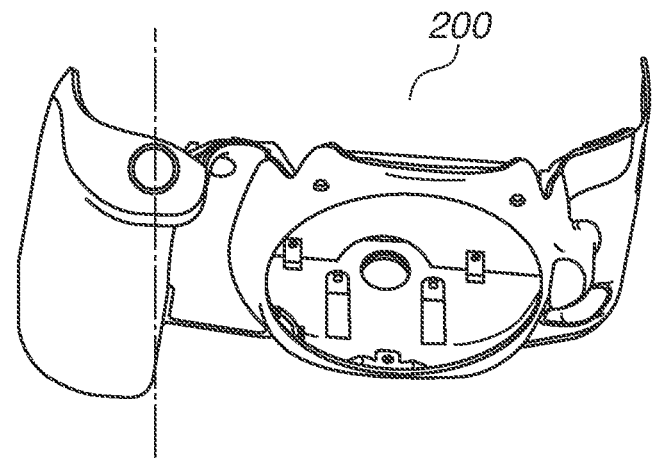
FIGS. 8A and 8B are a diagram illustrating a front cover unit as viewed from above and a cross-sectional diagram illustrating the front cover unit, respectively, in a camera according to a second exemplary embodiment.
Figure 8B:
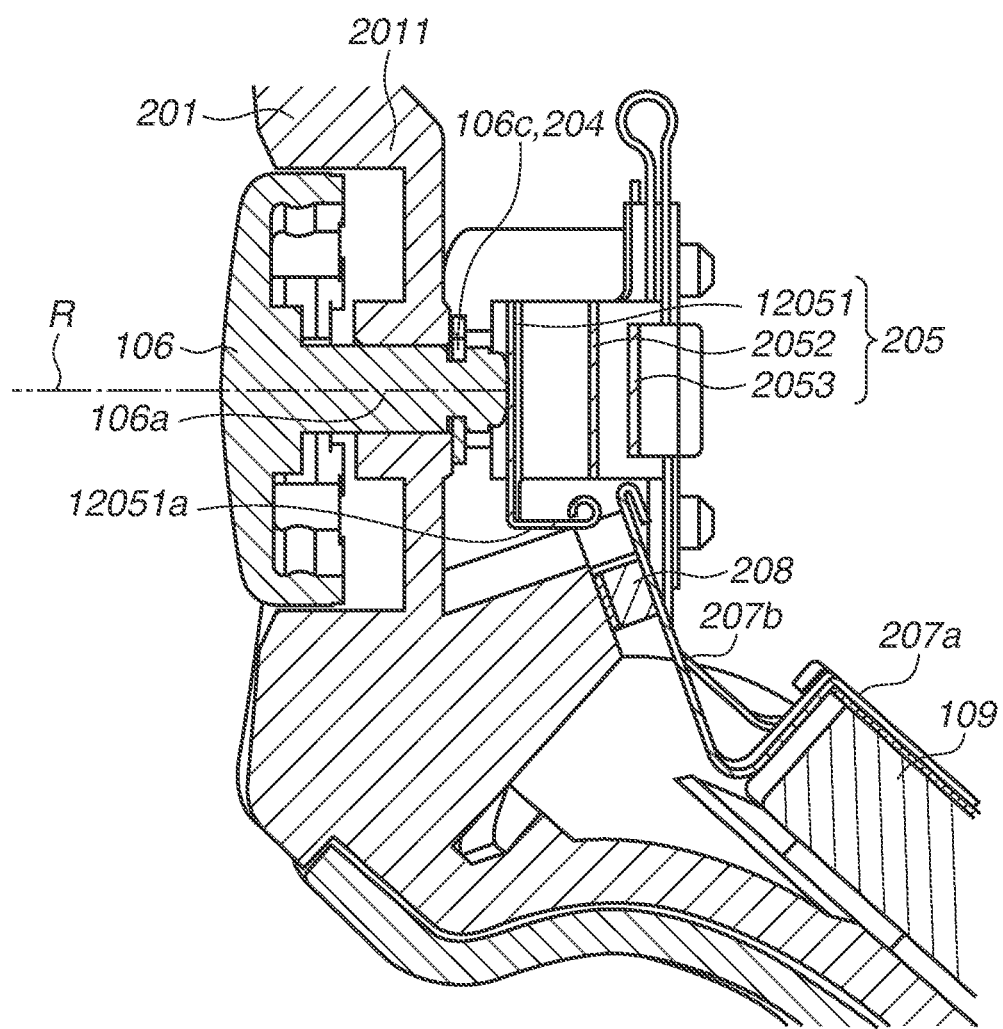

FIG. 8A illustrates the front cover unit 200 as viewed from immediately above the release button 106, and FIG. 8B illustrates an enlarged cross-section taken along a line illustrated in FIG. 8A.

The line in FIG. 8A passes through the central axis of the pusher 106a of the release button 106.

The switch unit 205 is fixed to the inside of the front cover 201 with the screw 206 (see FIGS. 4A and 4B).

The switch unit 205 includes, in order from the release button 106 side, the first contact piece 12051 serving as a first elastic member, the second contact piece 2052 serving as a second elastic member, and the third contact piece 2053 serving as a third elastic member insulated from each other.

A free end of the first contact piece 12051 is in pressure contact with the tip of the pusher 106a of the release button 106 to push the release button 106 upward.

The E-ring 204 fit in the groove portion 106c of the pusher 106a abuts the lower end of the storage portion 2011 of the front cover 201, so that the upper position of the release button 106 in the R-axis direction is regulated.

The first contact piece 12051 includes the contact portion 12051a extending in the R-axis direction.

Further, the free ends of the second contact piece 2052 and the third contact piece 2053 abut the position regulating portions 2015 and 2016 of the front cover 201 (see FIGS. 5A to 5D), so that the position of the free end of each of the second contact piece 2052 and the third contact piece 2053 in the R-axis direction is regulated.

In the normal state illustrated in FIG. 8B, the vibration damping member 208 is pressed by the vibration propagation portion 207b to be in pressure-contact therewith.

The vibration of the vibration device 109 propagates to the vibration propagation portion 207b via the base surface 207a of the holding component 207. The amount of the vibration propagating to the vibration propagation portion 207b damps in a section in which the vibration propagation portion 207b abuts the vibration damping member 208.

Therefore, the amount of the vibration propagating to the free end side of the vibration propagation portion 207b is smaller than the amount of the vibration generated in the vibration device 109.

Further, in the normal state, the vibration propagation portion 207b is away from the release button 106 and the first contact piece 12051, so that the vibration is not directly transmitted from the vibration propagation portion 207b to the release button 106.

In other words, even if the vibration device 109 is driven in the normal state, the noise generated by the vibration of the release button 106 that is a movable portion or the vibration propagation portion 207b that is elastically deformable can be minimized.

When the release button 106 is pressed against an elastic force of the first contact piece 2051 from the normal state in FIG. 8B, the first contact piece 2051 elastically transforms and comes into contact with the second contact piece 2052, so that the first switch SW1 is turned on.

When the first switch SW1 is turned on, the vibration device 109 is driven to feed an operational feeling of a half press back to the user.

Therefore, it may be desirable for the contact portion 12051a of the first contact piece 12051 to abut the vibration propagation portion 207b immediately before the first switch SW1 is turned on.

The first contact piece 2051 of the first switch SW1 includes the contact portion 12051a.

Therefore, the gap between the timing in which the first switch SW1 is turned on and the timing in which the contact portion 12051a abuts the vibration propagation portion 207b can be reduced as much as possible. This is an advantage of the second exemplary embodiment.

However, the contact portion 12051a is formed by press working, and thus the number of processes and the cost of components of the first contact piece 2051 can increase.

If pressing the release button 106 continues, the contact portion 12051a of the first contact piece 12051 further presses the vibration propagation portion 207b downward, so that the amount of the pressure-contact between the vibration propagation portion 207b and the vibration damping member 208 gradually decreases. In the SW1/SW2-ON state (not illustrated), the vibration propagation portion 207b moves downward to a position at which the vibration propagation portion 207b is not in contact with the vibration damping member 208.

In this way, at the position in the SW1/SW2-ON state brought by the operation of the release button 106 by the user, the vibration propagation portion 207b has such a positional relationship that the vibration propagation portion 207b is in contact with the contact portion 106b of the release button 106 via the first contact piece 12051 and away from the vibration damping member 208.

The vibration of the vibration device 109 propagates to the vibration propagation portion 207b via the base surface 207a of the holding component 207, and propagates to the external surface 106d of the release button 106 via the contact portion 12051a of the first contact piece 12051 without damping to keep the amount of the vibration large.

It is possible to give an operational feeling based on the vibration to a finger operating the release button 106 without causing a large damping of the vibration, even if the amount of the vibration of the vibration device 109 is reduced in the SW1/SW2-ON state.

In other words, the noise generated by the vibration of the vibration device 109 when the release button 106 is operated can be minimized.

The electronic apparatus according to the present exemplary embodiment includes an operation unit (the release button 106), a vibration device (the vibration device 109) that vibrates the electronic apparatus to transmit a sense of touch corresponding to an operation of the operation unit by the user to the user, and an exterior member (the front cover 201) to which the vibration device is attached.

The electronic apparatus according to the present exemplary embodiment further includes a vibration propagation member (the holding component 207) in contact with the vibration device, and a detection unit (the switch unit 205) that detects the operation unit being operated to shift from a first position to a second position.

The vibration device has a first vibration mode of vibrating the operation unit (the release button 106) at the second position and a second vibration mode of vibrating the exterior member (the front cover 201) at the first position.

The detection unit is not in contact with the vibration propagation member at the first position, and the detection unit is in contact with the vibration propagation member at the second position or before the detection unit arrives at the second position.

The detection unit includes a substrate having a first signal pattern and a second signal pattern, a first elastic member (the first contact piece 12051) being conductive and in contact with the first signal pattern, and a second elastic member (the second contact piece 2052 and the third contact piece 2053) being conductive and in contact with the second signal pattern.

The detection unit (the switch unit 205) detects the second position based on contact between the first elastic member (the first contact piece 12051) and the second elastic member (the second contact piece 2052 and the third contact piece 2053).

The contact portion 12051*a* of the first elastic member comes into contact with the vibration propagation member (the holding component 207) at the second position or before the detection unit arrives at the second position.

The release button 106, the first contact piece 12051, and the vibration propagation portion 207*b* that transmits the vibration of the vibration device 109 are configured in the manner describe above.

In that case, the vibration can be propagated to the release button 106 using the vibration device 109 in the camera, only when the user operates the release button 106.

In addition, the noise generated by the vibration of the vibration device 109 can be minimized when an operation member other than the release button 106 is operated by the user.

The above-described exemplary embodiment is only a representative example, and can be variously altered and modified in implementing the present disclosure.

According to the exemplary embodiments of the present disclosure, the vibration can be propagated to the release button using the vibration device in the electronic apparatus, only when the user operates the release button.

In addition, the noise generated by the vibration of the vibration device can be minimized when an operation member other than the release button is operated by the user.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-032452, filed Feb. 27, 2020, which is hereby incorporated by reference herein in its entirety.

What is claimed is:

1. An electronic apparatus comprising:
an operation unit;
a vibration device configured to vibrate the electronic apparatus to transmit a sense of touch to a user corresponding to an operation of the operation unit by the user;
an exterior member to which the vibration device is attached;
a vibration propagation member in contact with the vibration device; and
a detection unit configured to detect the operation unit being operated to shift from a first position to a second position,
wherein the vibration device has a first vibration mode of vibrating the operation unit while the operation unit is at the second position and a second vibration mode of vibrating the exterior member while the operation unit is at the first position, and
wherein the operation unit is not in contact with the vibration propagation member at the first position, and the operation unit is in contact with the vibration propagation member at the second position or as the operation unit arrives at the second position.

2. The electronic apparatus according to claim 1,
wherein the operation unit includes a contact portion extending in a moving direction of the operation unit,
wherein the vibration propagation member includes a base surface on which the vibration device is mounted, and an extension portion extending toward the contact portion and elastically deformable, and
wherein the contact portion abuts the extension portion at the second position.

3. The electronic apparatus according to claim 2,
wherein a vibration damping member is attached to inside of the exterior member, and
wherein the vibration damping member is pressed by the extension portion to be in pressure-contact with the extension portion at the first position.

4. The electronic apparatus according to claim 3, wherein as the operation unit nears the second position, an amount of the pressure-contact between the vibration damping member and the extension portion decreases.

5. The electronic apparatus according to claim 3, wherein a position at which the vibration damping member is in pressure-contact with the extension portion is between a position where the contact portion and the extension portion abut each other at the second position and the base surface.

6. The electronic apparatus according to claim 1, wherein the operation unit and the vibration propagation member are held by the exterior member.

7. An electronic apparatus comprising:
an operation unit;
a vibration device configured to vibrate the electronic apparatus to transmit a sense of touch to a user corresponding to an operation of the operation unit by the user;
an exterior member to which the vibration device is attached;
a vibration propagation member in contact with the vibration device; and
a detection unit configured to detect the operation unit being operated to shift from a first position to a second position,
wherein the vibration device has a first vibration mode of vibrating the operation unit while the operation unit is at the second position and a second vibration mode of vibrating the exterior member while the operation unit is at the first position, and
wherein the detection unit is not in contact with the vibration propagation member at the first position, and the detection unit is in contact with the vibration propagation member at the second position or as the detection unit arrives at the second position.

8. The electronic apparatus according to claim 7,
wherein the detection unit includes a substrate having a first signal pattern and a second signal pattern, a first elastic member being conductive and in contact with the first signal pattern, and a second elastic member being conductive and in contact with the second signal pattern,
wherein the detection unit detects the second position based on contact between the first elastic member and the second elastic member, and wherein a contact portion of the first elastic member comes into contact with the vibration propagation member at the second position or as the detection unit arrives at the second position.

* * * * *